United States Patent
Swoboda et al.

(10) Patent No.: US 8,024,102 B2
(45) Date of Patent: Sep. 20, 2011

(54) METHOD AND DEVICE FOR NOTIFYING THE DRIVER OF A MOTOR VEHICLE

(75) Inventors: Hans-Christian Swoboda, Großbottwas (DE); Albrecht Irion, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1352 days.

(21) Appl. No.: 10/520,604

(22) PCT Filed: Mar. 18, 2003

(86) PCT No.: PCT/DE03/00872
§ 371 (c)(1),
(2), (4) Date: Sep. 26, 2005

(87) PCT Pub. No.: WO2004/007231
PCT Pub. Date: Jan. 22, 2004

(65) Prior Publication Data
US 2006/0152350 A1    Jul. 13, 2006

(30) Foreign Application Priority Data
Jul. 10, 2002  (DE) .................................. 102 31 687

(51) Int. Cl.
*G08G 1/16* (2006.01)
*B60K 31/18* (2006.01)

(52) U.S. Cl. ............ 701/96; 701/48; 701/301; 180/171; 180/169; 340/436

(58) Field of Classification Search .................. 180/171; 701/96
See application file for complete search history.

(56) References Cited

U.S. PATENT DOCUMENTS

| | | | | |
|---|---|---|---|---|
| 5,230,400 A | * | 7/1993 | Kakinami et al. | 180/169 |
| 5,400,864 A | * | 3/1995 | Winner et al. | 180/169 |
| 5,781,103 A | * | 7/1998 | Gilling | 340/441 |
| 6,009,368 A | * | 12/1999 | Labuhn et al. | 701/96 |
| 6,178,372 B1 | * | 1/2001 | Tabata et al. | 701/97 |
| 6,311,120 B1 | * | 10/2001 | Asada | 701/96 |
| 6,552,969 B1 | * | 4/2003 | Gotoh et al. | 369/44.27 |
| 6,553,293 B1 | * | 4/2003 | Hac | 701/42 |
| 6,560,525 B1 | * | 5/2003 | Joyce et al. | 701/96 |
| 6,591,180 B1 | * | 7/2003 | Steiner | 701/96 |
| 2001/0039472 A1 | * | 11/2001 | Isogai et al. | 701/96 |
| 2002/0138190 A1 | * | 9/2002 | Hellmann et al. | 701/78 |
| 2002/0177935 A1 | * | 11/2002 | Winner et al. | 701/93 |

FOREIGN PATENT DOCUMENTS

| | | |
|---|---|---|
| DE | 100 15 299 | 10/2001 |
| EP | 1101647 | 5/2001 |
| JP | 5024524 | 2/1993 |
| JP | 2000085407 | 3/2000 |
| WO | WO0172545 | 10/2001 |

* cited by examiner

*Primary Examiner* — Thomas Black
*Assistant Examiner* — Lin B Olsen
(74) *Attorney, Agent, or Firm* — Kenyon & Kenyon LLP

(57) ABSTRACT

A device and a method for notifying the driver of a motor vehicle, equipped with an adaptive distance and speed controller, by activating a takeover prompt, informing the driver that the vehicle is coming critically close to a target object. The takeover prompt is activated and deactivated as a function of a fixed minimum distance between the distance- and speed-controlled vehicle and the target object and/or a relative speed-dependent minimum distance between the distance- and speed-controlled vehicle and a target object and/or a maximum vehicle deceleration producible by the distance and speed controller.

26 Claims, 3 Drawing Sheets

METHOD AND DEVICE FOR NOTIFYING THE DRIVER OF A MOTOR VEHICLE

FIELD OF THE INVENTION

The present invention relates to a device and a method for notifying the driver of a motor vehicle equipped with an adaptive distance and speed controller, in which a takeover prompt is activated, informing the driver that the vehicle is coming critically close to a target object. The takeover prompt is activated and deactivated as a function of a fixed minimum distance between the distance- and speed-controlled vehicle and the target object and/or a relative speed-dependent minimum distance between the distance- and speed-controlled vehicle and a target object and/or a maximum vehicle deceleration producible by the distance and speed controller.

BACKGROUND INFORMATION

German Patent Application No. DE 100 15 299 A1 describes a method and a corresponding device for triggering a takeover prompt, which signals the driver of a vehicle equipped with adaptive cruise control that the adaptive cruise control system is probably no longer able to control the driving situation and that the driver must intervene. By monitoring two or more vehicle variables, which are causal in triggering the takeover prompt, the probability of a false alarm by the system is reduced, and the triggering of the takeover prompt is adapted to the current vehicle speed.

SUMMARY

In accordance with example embodiments of the present invention, a method and a corresponding device are provided, which notify the driver of a motor vehicle equipped with an adaptive distance and speed controller via a takeover prompt when the vehicle gets critically close to a target object. In this instance, the activation and deactivation of the takeover prompt is to occur in such a way that the driver is always able to understand it and that the driving comfort of the adaptive distance and speed control system is not impaired by an activation or deactivation of the takeover prompt that is either too early or too late.

The takeover prompt may be advantageously implemented as an visual display in the driver's field of view and/or as an acoustic signal in the vehicle interior. Providing the takeover prompt as a visual display or as an acoustic signal or as a combination of both ensures that the driver takes note of the activation of the takeover prompt even in distracting surrounding conditions.

It is furthermore advantageous if the takeover prompt is also issued when the driver overrides the distance and speed control system. Overriding of the distance and speed control system occurs, for example, when the driver depresses the accelerator and therefore causes an acceleration of the vehicle that is not provided for by distance and speed control variables. In this case, the takeover prompt is also activated and deactivated, when the vehicle comes critically close to a target object, so as to inform the driver that by his overriding he is leaving the dynamic range of the distance and speed control system and that abruptly terminating the override can result in an uncomfortable controller reaction.

Advantageously, the activation thresholds and the deactivation thresholds of the takeover prompt are not identical. Due to the fact that the deactivation thresholds of the takeover prompt are shifted with respect to the activation thresholds to less critical distance and relative speed combinations, a hysteresis effect is achieved, which prevents the takeover control from jittering, so that the driver is not confused by a frequent activation and deactivation of the takeover prompt.

It is especially advantageous if the system for the distance and speed control, which controls the takeover prompt for notifying the driver, emits and receives radar or lidar signals, with the aid of which preceding vehicles can be recognized as target objects.

The method according to an example embodiment of the present invention may be in the form of a control element, which is provided for a control unit of an adaptive distance or speed control of a motor vehicle. To this end, a program executable on a computer, in particular on a microprocessor or signal processor, and suitable for implementing the method according to the present invention, is stored on the control element. Thus, in this case, the present invention is implemented by a program stored on the control element, so that this control element equipped with the program constitutes the present invention in the same manner as does the method, for the execution of which the program is suitable. In particular, an electric storage medium, e.g., a read only memory, may be used as the control element.

Further features, uses and advantages of the present invention are derived from the following description of exemplary embodiments of the present invention which are shown in the figures. All the features described or illustrated here, either alone or in any desired combination, constitute the subject matter of the present invention, regardless of their combination in the description or illustrated in the drawings.

BRIEF DESCRIPTION OF THE DRAWINGS

In the following, exemplary embodiments of the present invention are explained with reference to figures.

DETAILED DESCRIPTION OF THE EXAMPLE EMBODIMENTS

Figure 1:
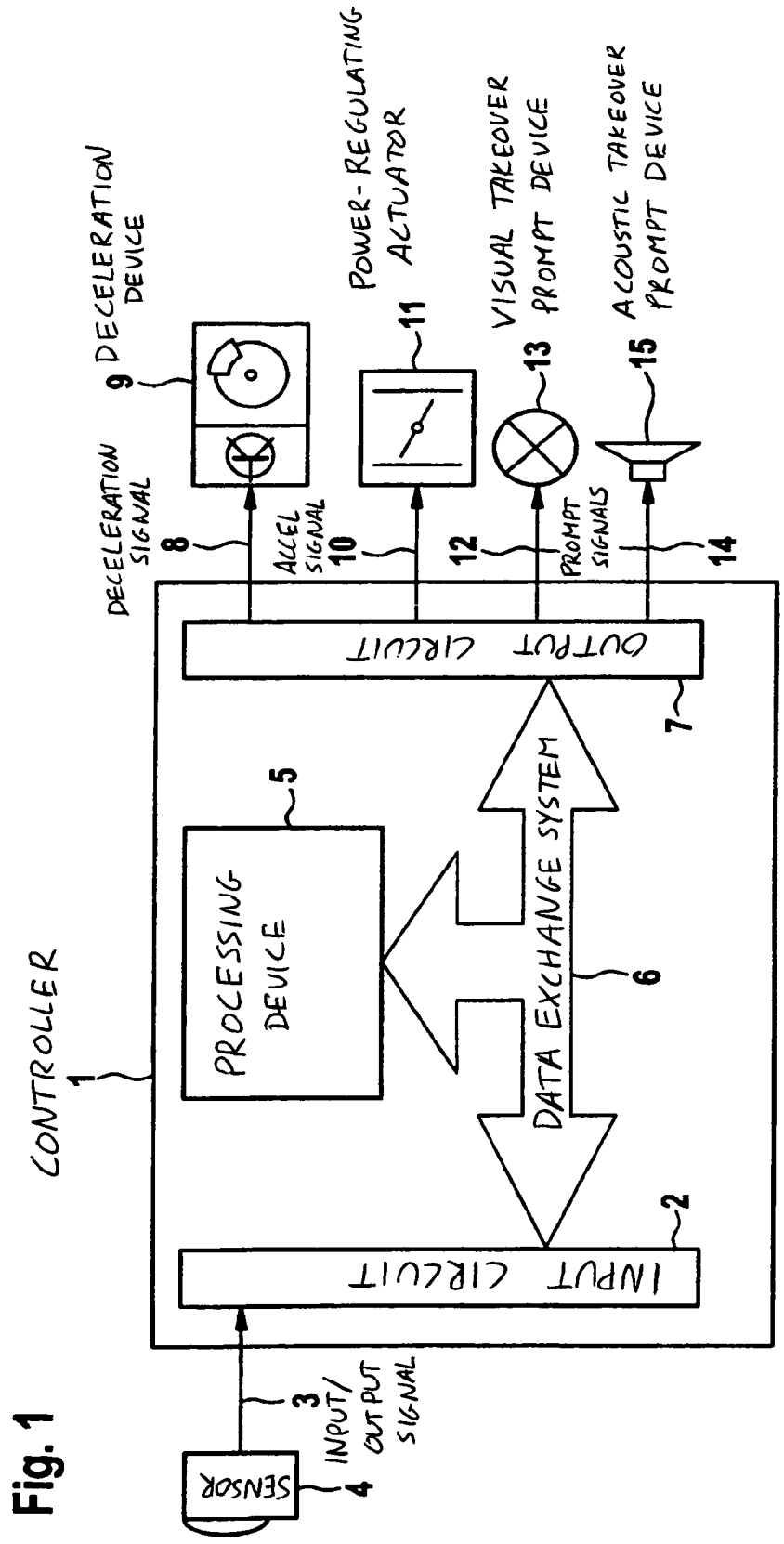
FIG. 1 shows a block diagram of an exemplary embodiment of the device according to the present invention.

FIG. 1 shows a block diagram of a device according to an example embodiment of the present invention. One can see the distance and speed controller 1, which has an input circuit 2. Input signals 3 from a radar or lidar sensor 4 are fed to the distance and speed controller via input circuit 2. In this context, radar or lidar sensor 4 emits radar or laser radiation, which is in part reflected by objects and received by the radar or lidar sensor. In the case of a radar sensor, the radar radiation can have an FMCW modulation or a pulse modulation. From the measured input signals, radar or lidar sensor 4 generates output signals 3, which are fed to distance and speed controller 1 as input signals. These signals include at least the variables distance of the objects d and relative speeds Vrel of the objects with respect to the distance- and speed-controlled vehicle. Via input circuit 2, these variables are fed to distance and speed controller 1, which forwards them to a processing device 5 via a data exchange system 6, which may be a CAN bus for example. This processing device 5 may be a microprocessor or a signal processor, for example, in which actuating and control variables are formed from the variables measured by sensor 4. For this purpose, processing device 5 ascertains from the relative position of the objects detected by sensor 4 as well as from their distance d and their relative speed Vrel at least one target object that is of particular relevance for the distance and speed control, since these target objects have a particularly strong influence on the output variables. Thus, processing device 5 generates control signals for a deceleration device 9 of the vehicle, control signals for a power-regulating actuating element 11 of a vehicle drive unit, which may take the form of a throttle-valve actuator, as well as signals for activating and deactivating a takeover prompt for the driver of the vehicle. These output signals generated by processing device 5 are output to an output circuit 7 via data exchange system 6. Via output circuit 7, a deceleration signal 8 is output to a deceleration device 9 of the vehicle. This deceleration signal 8 is normally fed to a brake control device, which actuates the brakes of the vehicle according to deceleration signal 8. Moreover, via output circuit 7, an acceleration signal 10 is output, which is fed to a power-regulating actuating element 11 of a vehicle drive unit. Normally, this power-regulating actuating element 11 is an electrically operated throttle valve or a fuel injection pump. Via acceleration signal 10, the vehicle drive unit is correspondingly modified in accordance with the controller output variables. Moreover, via output circuit 7, a takeover prompt signal 12 may be output, which is fed to a visual takeover prompt device 13. This visual takeover prompt device, for example, is a light source in the visual range of the driver or a plain text display, which is located in the visual range of the driver, and which visually signals the driver that the limited decelerating ability of the distance and speed control system is insufficient to prevent the vehicle from coming critically close to a target object. In a similar way, output circuit 7 can output an additional takeover prompt signal 14 to an acoustic takeover prompt device 15. This acoustic takeover prompt device 15 may be, for example, a buzzer or a ring tone in the vehicle interior or a voice output device, which prompts the driver to perform a deceleration intervention. Since distance and speed controllers are often designed as comfort systems and are not supposed to relieve the driver in critical situation from the responsibility of personally initiating a deceleration or of reinforcing an automatically initiated deceleration, the deceleration dynamics, which the distance and speed controller is able to control, is often limited to 2 to 3 m/sec$^2$. This limited decelerating ability of the distance and speed controller makes it necessary to inform the driver when the driver must intervene to abandon the range of the automatic deceleration dynamics so as to prevent the vehicle from coming critically close to a detected object.

Figure 2:
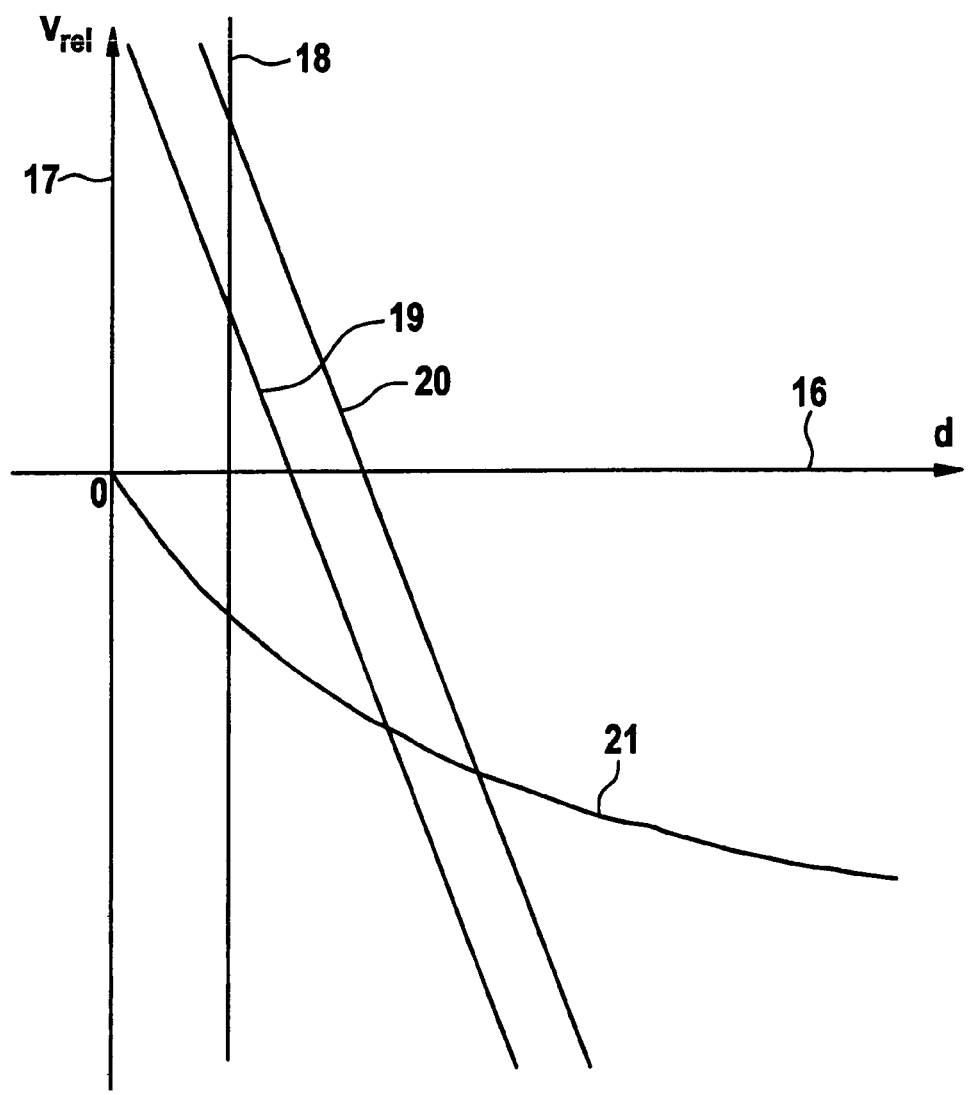
FIG. 2 shows a distance-relative speed diagram for explaining a method according to the present invention.

FIG. 2 shows a distance-relative speed diagram, in which the distance from the target object to the distance- and speed-controlled vehicle is plotted on abscissa 16 and the relative speed of the target object with respect to the distance- and speed-controlled vehicle is plotted on ordinate 17. In the case of positive relative speed values Vrel, the relative speed plotted on ordinate 17 describes the case in which the target object moves at a higher speed than one's own vehicle, that is to say, that the distance d between the target object and one's own vehicle increases over time, and, in the case of negative relative speed values Vrel, it means that the distance d between the target object and one's own vehicle decreases over time, since the preceding target object moves more slowly than one's own vehicle. Whether takeover prompt 13, 15 is to be activated or deactivated depends on the combination of the relative speed Vrel and the distance d between the target object and one's own vehicle. Line 18 drawn vertically into the diagram of FIG. 2 represents a first activation and deactivation threshold. This line 18 defines an absolute minimum distance dmin between the target object and one's own vehicle, the takeover prompt being activated when the threshold is undershot and deactivated when it is exceeded. This absolute minimum distance dmin is set to be independent of speed. The straight line 19 represents a second activation threshold for the takeover prompt, which represents a speed-dependent [minimum distance]. The straight line 20 situated parallel to this straight line 19 represents the deactivation threshold such that, in this speed-dependent activation and deactivation threshold, a hysteresis effect is generated, which is to prevent a quick and repeated activation and deactivation of the takeover prompt. If the combination of relative speed Vrel and distance d occurs in such a way that it is represented by a point on the diagram on the left below straight line 19, then the takeover prompt is activated and will only be deactivated again when the combination of relative speed Vrel and distance d describes a point on the diagram which is located on the right above deactivation line 20. This speed-dependent minimum distance ensures that in case of a negative relative speed, that is, in case the speed of one's own vehicle is higher than that of the target object, the takeover prompt is activated already at a greater distance d as compared to positive relative speeds Vrel, at which the target object moves away, since it has a higher speed than one's own vehicle. Furthermore, a third activation and deactivation threshold 21 is charted, which takes into account the maximum vehicle deceleration producible by the distance and speed controller. Because the distance and speed controllers are designed as comfort systems, the maximum deceleration producible by such a system lies far below the maximum possible vehicle deceleration. Normally, distance and speed controllers are able to control vehicle decelerations in the range of 2 to 3 m/sec$^2$. Line 21 in FIG. 2 indicates the pairs of values, made up of the relative speed Vrel and the distance d, at which the vehicle speed control system decelerates at the maximum possible system deceleration of 2 to 3 m/sec$^2$, for example, and a collision with the preceding target object can only just be avoided. With a combination of relative speed Vrel and distance d, whose diagram point, according to FIG. 2, lies on the left below curve 21, the distance and speed controller, due to the limited deceleration capability, would not be able to prevent a collision with the preceding target object. In this case, the driver of the vehicle is prompted personally to initiate a deceleration, the deceleration values of which are quantitatively higher than those achievable by the system, so that the driver can avoid a collision by a brake intervention. To this end, however, the driver is notified, which is done by triggering the takeover prompt. A crossing of line 21 from pairs of values, made up of relative speed Vrel and distance d, lying on the right above line 21, to pairs of values lying on the left below curve 21 results in an activation of the takeover prompt, which prompts the driver to perform a brake intervention. If the operating point according to FIG. 2, made up of the values relative speed Vrel and distance d, changes in such a way that line 21 shifts from points lying on the left below curve 21 to pairs of values lying on the right above curve 21, then the takeover prompt is deactivated, since the distance and speed controller is again able to avoid a collision with the preceding target object considering the maximum possible, limited system deceleration.

Figure 3:
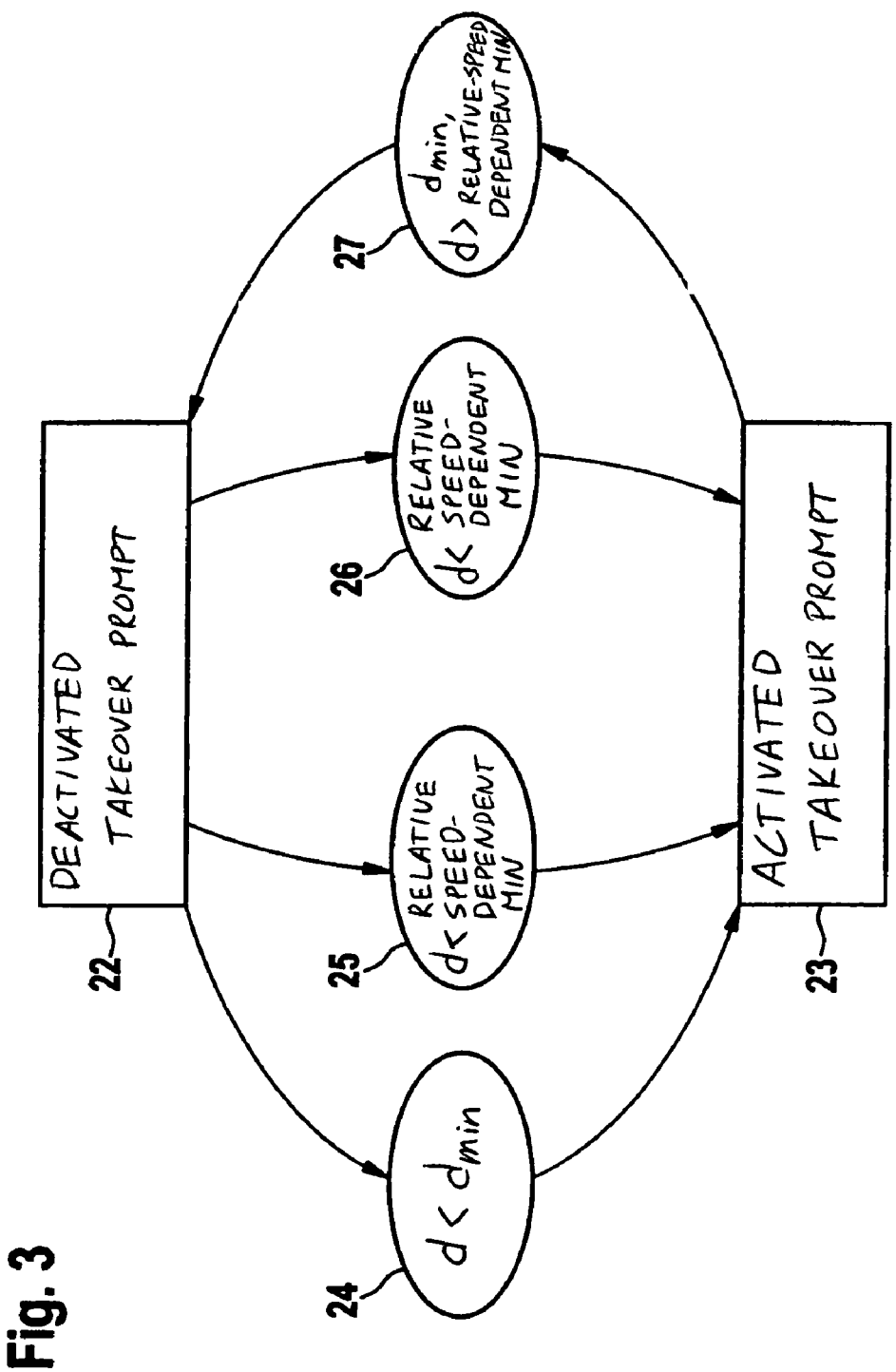
FIG. 3 shows a state transition diagram of the method according to the present invention.

FIG. 3 shows a state transition diagram describing the activation and deactivation of the takeover prompt as well as the conditions required for such state transitions. FIG. 3 shows the rectangular state blocks 22 and 23. In this context, state block 22 describes the state of the deactivated takeover prompt, in which the visual or acoustic takeover prompt is switched off. Block 23 represents the state in which the takeover prompt is activated, i.e., in which the visual takeover prompt is illuminated or a plain text indicator is displayed to the driver, or an acoustic takeover prompt is sounded. Changes of state in accordance with FIG. 3 between an activated takeover prompt and a deactivated takeover prompt occur as a function of the change of the pairs of values for the relative speed Vrel and the distance d to the target object in accordance with FIG. 2. Thus, the takeover prompt is activated, for example, if an absolute minimum distance dmin is undershot according to block 24. According to FIG. 2, this is the case if the distance d decreases in such a way that a pair of values made up of relative speed Vrel and distance d traverses the straight line 18 from right to left, i.e., if the distance d decreases in such a way that it becomes smaller than the minimum distance dmin. Such a change of the pair of values Vrel and d, in which the representation in the diagram according to FIG. 2 shifts from points left of straight line 18 to points right of straight line 18, i.e., an increase of the distance d such that dmin is exceeded, results in a deactivation of the takeover prompt, in which there is a transition from state 23 to state 22 as long as no other triggering conditions are fulfilled. In the same way, according to block 25, there is an activation as a consequence of a transition of state from block 22 to block 23 if a relative speed-dependent minimum distance is undershot. This is the case as soon as pairs of values made up of relative speed Vrel and distance d change according to FIG. 2 in such a way that the point in FIG. 2 representing this pair of values shifts from the half-plane on the right above straight line 19 to pairs of values according to the half-plane on the left below straight line 19. A third transition condition shown in block 26, which likewise represents a transition of state from block 22 to block 23, consists in the crossing of line 21 from pairs of value on the right above this line 21 to pairs of values on the left below this line 21. In this case, the driver is alerted to the fact that the maximum possible system deceleration is insufficient to prevent a collision with the preceding target object. A deactivation of the takeover prompt is represented by transition 27, which triggers a transition of state from block 23 to block 22. In this case, the activated takeover prompt is deactivated, thus informing the driver that it is not or no longer necessary to intervene in the driving events since the danger of coming critically close to a target object currently does not or does no longer exist. This transition according to 27 occurs when none of the activation conditions according to transitions 24, 25 or 26 continue to be fulfilled. According to the pairs of values from FIG. 2, this is the case when the current distance d to the target object as well as the current relative speed Vrel are such that a point on the diagram is assumed, which according to FIG. 2 lies to the right of straight line 18, on the right above deactivation line 20 as well as on the right above hyperbolic line 21. If these three conditions are fulfilled, then state 23, in which the takeover prompt is active, passes over according to transition 27 into state 22 in that the takeover prompt is deactivated.

According to additional exemplary embodiments, an activation 23 or deactivation 22 of takeover prompt 13, 15 is provided only in the case of an undershooting or exceeding of fixed minimum distance 18 between the preceding target object and the distance- and speed-controlled vehicle. It is likewise possible that, instead of fixed minimum distance 18, an activation 23 or deactivation 22 of takeover prompt 13, 15 occurs only as a function of the relative speed-dependent minimum distance when activation line 19 is undershot or deactivation line 20 is exceeded. Furthermore, it is likewise possible that activation 23 or deactivation 22 of takeover prompt 13, 15 occurs only as a function of a maximum vehicle deceleration producible by distance and speed controller 1, depending on whether, on the basis of the maximum vehicle deceleration producible by distance and speed controller 1, it is probable that the following vehicle is no longer able to stop or is again able to stop in time prior to reaching the target object. Further exemplary embodiments of the present invention include methods and devices which provide for an activation or deactivation of the takeover prompt as a function of two of the individual conditions described above. FIG. 3 is simplified accordingly in that one or two transition conditions of transitions 24, 25 or 26 are eliminated and block 27 is simplified correspondingly.

What is claimed is:

1. A method for notifying a driver of a motor vehicle equipped with an adaptive distance and speed controller, comprising:
  one of activating or deactivating a takeover prompt which informs the driver that the vehicle is coming critically close to a target object to prompt the driver to perform a brake intervention;
  wherein the activation or deactivation of the takeover prompt occurs as a function of at least one of: i) a fixed minimum distance between a distance-controlled and speed-controlled vehicle and the target object, ii) a relative speed-dependent minimum distance of the distance-controlled and speed-controlled vehicle in relation to the target object, and iii) a maximum vehicle deceleration producible by the distance and speed controller, and wherein the takeover prompt is further output when the driver overrides the distance and speed controller by depressing an accelerator and the vehicle comes critically close to the target object, and
  wherein the takeover prompt is deactivated to inform the driver that the distance and speed controller is able to avoid a collision with the target object.

2. The method as recited in claim 1, wherein the takeover prompt is at least one of: a visual display in a field of view of the driver, and an acoustic signal in an interior of the vehicle.

3. The method as recited in claim 1, wherein activation thresholds and deactivation thresholds of the takeover prompt are not identical.

4. The method as recited in claim 1, wherein the distance and speed controller emits and receives radar signals, with the aid of which preceding vehicles can be recognized as target objects.

5. The method as recited in claim 1, wherein the takeover prompt is at least one of: a visual display in a field of view of the driver, and an acoustic signal in an interior of the vehicle, wherein activation thresholds and deactivation thresholds of the takeover prompt are not identical, and wherein the distance and speed controller emits and receives radar signals, with the aid of which preceding vehicles can be recognized as target objects.

6. The method as recited in claim 1, wherein the activation or deactivation of the takeover prompt occurs as a function of the fixed minimum distance between a distance-controlled and speed-controlled vehicle and the target object.

7. The method as recited in claim 1, wherein the activation or deactivation of the takeover prompt occurs as a function of the relative speed-dependent minimum distance of the distance-controlled and speed-controlled vehicle in relation to the target object.

8. The method as recited in claim 1, wherein the activation or deactivation of the takeover prompt occurs as a function of the maximum vehicle deceleration producible by the distance and speed controller.

9. The method as recited in claim 1, wherein the activation or deactivation of the takeover prompt occurs if an undershooting or exceeding of the fixed minimum distance between the preceding target object and a distance-controlled and speed-controlled vehicle.

10. The method as recited in claim 1, wherein the activation or deactivation of the takeover prompt occurs as a function of the relative speed-dependent minimum distance when an activation line is undershot or a deactivation line is exceeded.

11. The method as recited in claim 1, wherein the activation or deactivation of the takeover prompt occurs as a function of a maximum vehicle deceleration producible by the distance and speed controller, depending on whether, based on the maximum vehicle deceleration producible by the distance and speed controller, it is probable that the following vehicle is no longer able to stop or is again able to stop in time prior to reaching the target object.

12. A device for the distance and speed control of a motor vehicle, comprising:
an arrangement which outputs a takeover prompt, informing a driver that the vehicle is coming critically close to a target object to prompt the driver to perform a brake intervention, the arrangement being configured so that activation and deactivation of the takeover prompt occurs as a function at least one of: i) a fixed minimum distance between the distance- and speed-controlled vehicle and the target object, ii) a relative speed-dependent minimum distance between the distance- and speed-controlled vehicle and the target object, and iii) a maximum vehicle deceleration producible by the distance and speed controller, wherein the takeover prompt is further output when the driver overrides the distance and speed controller by depressing an accelerator and the vehicle comes critically close to the target object, and wherein the takeover prompt is deactivated to inform the driver that the distance and speed controller is able to avoid a collision with the target object.

13. The device as recited in claim 12, further comprising:
a display device, the display device displaying the takeover prompt in a field of view of the driver.

14. The device as recited in claim 12, further comprising:
an acoustic device, the takeover prompt being output as an acoustic signal by the acoustic device in an interior of the vehicle.

15. The device as recited in claim 12, further comprising:
a radar device, the radar device configured to emit and receive radar signals so that a preceding vehicle can be recognized as a target object.

16. The device as recited in claim 12, further comprising:
a display device, the display device displaying the takeover prompt in a field of view of the driver; and
an acoustic device, the takeover prompt being output as an acoustic signal by the acoustic device in an interior of the vehicle.

17. The device as recited in claim 16, further comprising:
a radar device, the radar device configured to emit and receive radar signals so that a preceding vehicle can be recognized as a target object.

18. The method as recited in claim 12, wherein activation thresholds and deactivation thresholds of the takeover prompt are not identical.

19. The method as recited in claim 18, wherein the distance and speed controller emits and receives radar signals, with the aid of which preceding vehicles can be recognized as target objects.

20. The device as recited in claim 12, further comprising:
at least one of a display device, the display device displaying the takeover prompt in a field of view of the driver, and an acoustic device, the takeover prompt being output as an acoustic signal by the acoustic device in an interior of the vehicle; and
a radar device, the radar device configured to emit and receive radar signals so that a preceding vehicle can be recognized as a target object;
wherein activation thresholds and deactivation thresholds of the takeover prompt are not identical, and
wherein the distance and speed controller emits and receives radar signals, with the aid of which preceding vehicles can be recognized as target objects.

21. The device as recited in claim 12, wherein the activation or deactivation of the takeover prompt occurs as a function of the fixed minimum distance between the distance-controlled and speed-controlled vehicle and the target object.

22. The device as recited in claim 12, wherein the activation or deactivation of the takeover prompt occurs as a function of the relative speed-dependent minimum distance of the distance-controlled and speed-controlled vehicle in relation to the target object.

23. The device as recited in claim 12, wherein the activation or deactivation of the takeover prompt occurs as a function of the maximum vehicle deceleration producible by the distance and speed controller.

24. The device as recited in claim 12, wherein the activation or deactivation of the takeover prompt occurs if an undershooting or exceeding of the fixed minimum distance between the preceding target object and the distance-controlled and speed-controlled vehicle.

25. The device as recited in claim 12, wherein the activation or deactivation of the takeover prompt occurs as a function of the relative speed-dependent minimum distance when an activation line is undershot or a deactivation line is exceeded.

26. The device as recited in claim 12, wherein the activation or deactivation of the takeover prompt occurs as a function of the maximum vehicle deceleration producible by the distance and speed controller, depending on whether, based on a maximum vehicle deceleration producible by the distance and speed controller, it is probable that the following vehicle is no longer able to stop or is again able to stop in time prior to reaching the target object.

* * * * *